United States Patent
Miyaki (10) Patent No.: US 9,410,492 B2
(45) Date of Patent: Aug. 9, 2016

(54) ENGINE START CONTROL DEVICE (71) Applicant: SUZUKI MOTOR CORPORATION, Hamamatsu-shi, Shizuoka (JP)

(72) Inventor: Tomohiko Miyaki, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 772 days.

(21) Appl. No.: 13/659,724

(22) Filed: Oct. 24, 2012

(65) Prior Publication Data
US 2013/0104829 A1 May 2, 2013

(30) Foreign Application Priority Data

Oct. 26, 2011 (JP) ................. 2011-235059

(51) Int. Cl.
*F02N 11/08* (2006.01)
*F02M 69/32* (2006.01)
*F02D 41/06* (2006.01)
(Continued)

(52) U.S. Cl.
CPC ............ *F02D 31/005* (2013.01); *F02D 9/1055* (2013.01); *F02D 41/0002* (2013.01); *F02D 41/062* (2013.01); *F02M 69/32* (2013.01); *F02N 11/087* (2013.01); *F02D 2200/021* (2013.01);
(Continued)

(58) Field of Classification Search
CPC .............. F02N 11/08; F02N 2200/023; F02N 2250/02; F02N 11/087; F02M 69/32; F02D 31/005; F02D 41/0002; F02D 41/062; F02D 9/1055; F02D 2200/021; F02B 61/045; Y02T 10/42

USPC ........................ 123/179.3; 701/113
See application file for complete search history.

(56) References Cited

U.S. PATENT DOCUMENTS 4,491,922 A   1/1985  Kobayashi et al.
5,894,832 A   4/1999  Nogi et al.
(Continued)

FOREIGN PATENT DOCUMENTS

EP   1323911 A2   7/2003
JP   S63-075329   4/1988
(Continued)

OTHER PUBLICATIONS

Japanese Office Action dated Aug. 8, 2014, which issued during prosecution of Japanese Application No. 2011-235059, which corresponds to the present application.
(Continued)

*Primary Examiner* — Mahmoud Gimie
*Assistant Examiner* — David Hamaoui
(74) *Attorney, Agent, or Firm* — Troutman Sanders LLP (57) ABSTRACT

An engine start control device includes: a control valve which adjusts a gas flow rate of a gas channel provided so as to bypass a throttle valve of an engine; a starter motor capable of driving a crankshaft of the engine; a control unit which controls an opening degree of the control valve and a current supply to the starter motor; and a latch circuit which holds a command for current control from the control unit to the starter motor, wherein the control unit performs the control so as to cause the current supply to the starter motor to start after the opening degree of the control valve reaches a target opening degree for an engine start time, and even when the control unit is reset, the latch circuit continues the current supply to the starter motor according to the command for current control that the latch circuit keeps holding.

1 Claim, 5 Drawing Sheets

(51) Int. Cl.
*F02D 31/00* (2006.01)
*F02D 9/10* (2006.01)
*F02D 41/00* (2006.01)

(52) U.S. Cl.
CPC ....... *F02D 2200/023* (2013.01); *F02N 2250/02* (2013.01); *Y02T 10/42* (2013.01)

(56) References Cited

U.S. PATENT DOCUMENTS

| | | | | |
|---|---|---|---|---|
| 6,463,896 | B1* | 10/2002 | Fujiwara | F01L 9/04 123/90.11 |
| 6,640,763 | B2* | 11/2003 | Kawakami et al. | 123/179.3 |
| 6,923,047 | B2* | 8/2005 | Miyaki | F02D 29/02 73/114.56 |
| 8,110,939 | B2* | 2/2012 | Itou | F02N 11/0814 307/10.6 |
| 2002/0166529 | A1 | 11/2002 | Kawakami et al. | |
| 2005/0263122 | A1 | 12/2005 | Saito | |
| 2011/0208412 | A1* | 8/2011 | Takahashi | 701/113 |
| 2011/0218729 | A1* | 9/2011 | Takahashi | 701/113 |
| 2012/0104767 | A1* | 5/2012 | Gibson et al. | 290/36 R |
| 2013/0192548 | A1* | 8/2013 | Shogenji | F02D 41/0002 123/90.15 |

FOREIGN PATENT DOCUMENTS

| | | |
|---|---|---|
| JP | H06-307267 | 1/1994 |
| JP | 2002-339845 | 11/2002 |
| JP | 2006328965 A | 12/2006 |
| JP | 2007-002812 | 1/2007 |
| JP | 2010-223030 | 10/2010 |
| JP | 2010223030 A * | 10/2010 |

OTHER PUBLICATIONS

Extended European Search Report having a mail date of Apr. 23, 2015, issued in corresponding European Patent Application No. 12190007.0.

\* cited by examiner

ENGINE START CONTROL DEVICE

CROSS-REFERENCE TO RELATED APPLICATIONS

This application is based upon and claims the benefit of priority of the prior Japanese Patent Application No. 2011-235059, filed on Oct. 26, 2011, the entire contents of which are incorporated herein by reference.

BACKGROUND OF THE INVENTION

1. Field of the Invention

The present invention relates to an engine start control device, and more particularly, to an engine start control device of a type using a starter motor.

2. Description of the Related Art

There has conventionally been known a start control device of a type which starts an engine by rotating a crankshaft by a starter motor. In this engine start control device, an idle speed control valve (ISCV) for controlling an idle speed is provided in a bypass channel bypassing a throttle valve of the engine. The ISCV is structured to be capable of adjusting its opening degree by a stepping motor, and at the engine start time, it is possible to ensure an intake amount suitable for starting the engine by adjusting the opening degree of the ISCV to a target opening degree.

In the engine start control device, the driving of the stepping motor of the ISCV is controlled by a control unit. The control unit is connected to a battery via an ignition switch and is structured to be supplied with power when the ignition switch is turned on. Generally, the battery which supplies the power to the control unit is also used for supplying power to a starter motor.

As described above, at the engine start time, it is necessary to realize the intake amount suitable for the start by adjusting the opening degree of the ISCV to the target opening degree. Therefore, when the ignition switch is turned on, the control unit drives the stepping motor so that the ISCV is moved to the target opening degree. Here, when the starter motor is driven in order to start the engine, a large current passes through the starter motor, so that the supply voltage of the battery temporarily decreases. This results in a decrease also in the supply voltage to the control unit to stop the control unit, and when the supply voltage of the battery thereafter recovers to return to a predetermined value, there sometimes occurs resetting that is the reactivation of the control unit.

Not capable of distinguishing the reactivation due to the resetting and the activation caused when the ignition switch is turned on, the control unit tries to move the ISCV to the target opening degree again at the time of the reactivation due to the resetting, as in the case where the ignition switch is turned on. The target opening degree of the ISCV is customarily set as a step amount from a reference position, with a position of the ISCV at an instant when the control unit is activated being defined as the reference. Therefore, when the control unit is reset after changing the position of the ISCV in response to the turning on of the ignition switch, the control unit tries to further change the ISCV by a predetermined step amount, with the changed position being defined as the reference position. As a result, the ISCV is brought into a state greatly deviating from the target opening degree, which causes problems such as poor start and an unstable behavior of the engine.

In order to solve such problems, Patent Document 1, for instance, discloses an idle speed control device which is capable of distinguishing the resetting due to an off operation of an ignition switch and the resetting due to low-voltage instantaneous interruption of a CPU, and does not perform a valve opening operation of an idle speed control valve when the resetting of the CPU is due to the low-voltage instantaneous interruption.

[Patent Document 1] Japanese Laid-open Patent Publication No. 2010-223030

In the above-described Patent Document 1, since the ISCV is not operated when the resetting due to the voltage decrease occurs, it is not possible to cope with such a case where the opening degree of the ISCV is not properly maintained at the time of the resetting, for instance. Therefore, it is hard to say that the problems such as the poor start and the unstable behavior of the engine can be fully prevented.

SUMMARY OF THE INVENTION

The present invention was made in consideration of such problems, and has an object to provide an engine start control device capable of preventing poor start and an unstable behavior of an engine.

An engine start control device of the present invention includes: a control valve which adjusts a gas flow rate of a gas channel provided so as to bypass a throttle valve of an engine; a starter motor capable of driving a crankshaft of the engine; a control unit which controls an opening degree of the control valve and a current supply to the starter motor; and a latch circuit which holds a command for current control from the control unit to the starter motor, wherein the control unit performs the control so as to cause the current supply to the starter motor to start after the opening degree of the control valve reaches a target opening degree for an engine start time, and even when the control unit is reset, the latch circuit continues the current supply to the starter motor according to the command for current control that the latch circuit keeps holding.

According to this structure, the control unit performs the control so as to cause the current supply to the starter motor to start after the opening degree of the control valve reaches the target opening degree for the engine start time, and even when the control unit is reset, the latch circuit continues the current supply to the starter motor according to the command for current control that the latch circuit keeps holding, and therefore, it is possible to continue starting the engine while properly maintaining the opening degree of the control valve even when the control unit is reset due to a decrease of a supply voltage. This makes it possible to prevent the poor start and the unstable behavior of the engine.

In the engine start control device of the present invention, the control unit determines whether or not current activation is reactivation due to the resetting, based on the command for current control that the latch circuit holds.

The control unit preferably fixes the opening degree of the control valve when the current activation is the reactivation due to the resetting. According to this structure, it is possible to start the engine while properly maintaining the opening degree of the control valve since the opening degree of the control valve is fixed after the opening degree of the control valve reaches the target opening degree for the engine start time.

Further, preferably, the control unit does not initialize the opening degree of the control valve when the current activation is the reactivation due to the resetting. According to this structure, since the opening degree of the control valve is not initialized even when the control unit is reset due to a decrease of the supply voltage, the time required for the start and the time taken for the cranking by the starter motor are shortened, so that a reduction in the consumption of the battery can be expected, and a sharp increase and stall of the rotation speed due to the start during the initialization can be prevented.

Further, preferably, the engine start control device has a sensor which detects a state of the engine, wherein, when the current activation is the reactivation due to the resetting, the control unit recognizes the opening degree of the control valve from a state of the sensor. According to this structure, since the control unit recognizes the opening degree of the control valve from the state of the sensor after being reset, it is possible to prevent disagreement between an actual opening degree of the control valve and the opening degree of the control valve recognized by the control unit. This makes it possible to properly maintain the rotation speed of the engine even when the control unit is reset. In this case, the sensor which detects the state of the engine may be an engine temperature sensor.

In the engine start control device of the present invention, preferably, the control unit initializes the opening degree of the control valve at a timing when the power supply to the control unit is stopped after the engine is started or at a timing when the power supply to the control unit is stopped after the control unit is reset without the engine being started. According to this structure, since the opening degree of the control valve is initialized only when the initialization is required, it is possible to reduce the number of times of the initialization. Further, since there is no need for the initialization at the start time, the time taken for the restart can be reduced.

DETAILED DESCRIPTION OF THE PREFERRED EMBODIMENTS

Hereinafter, an embodiment will be described in detail with reference to the attached drawings.

Figure 1:
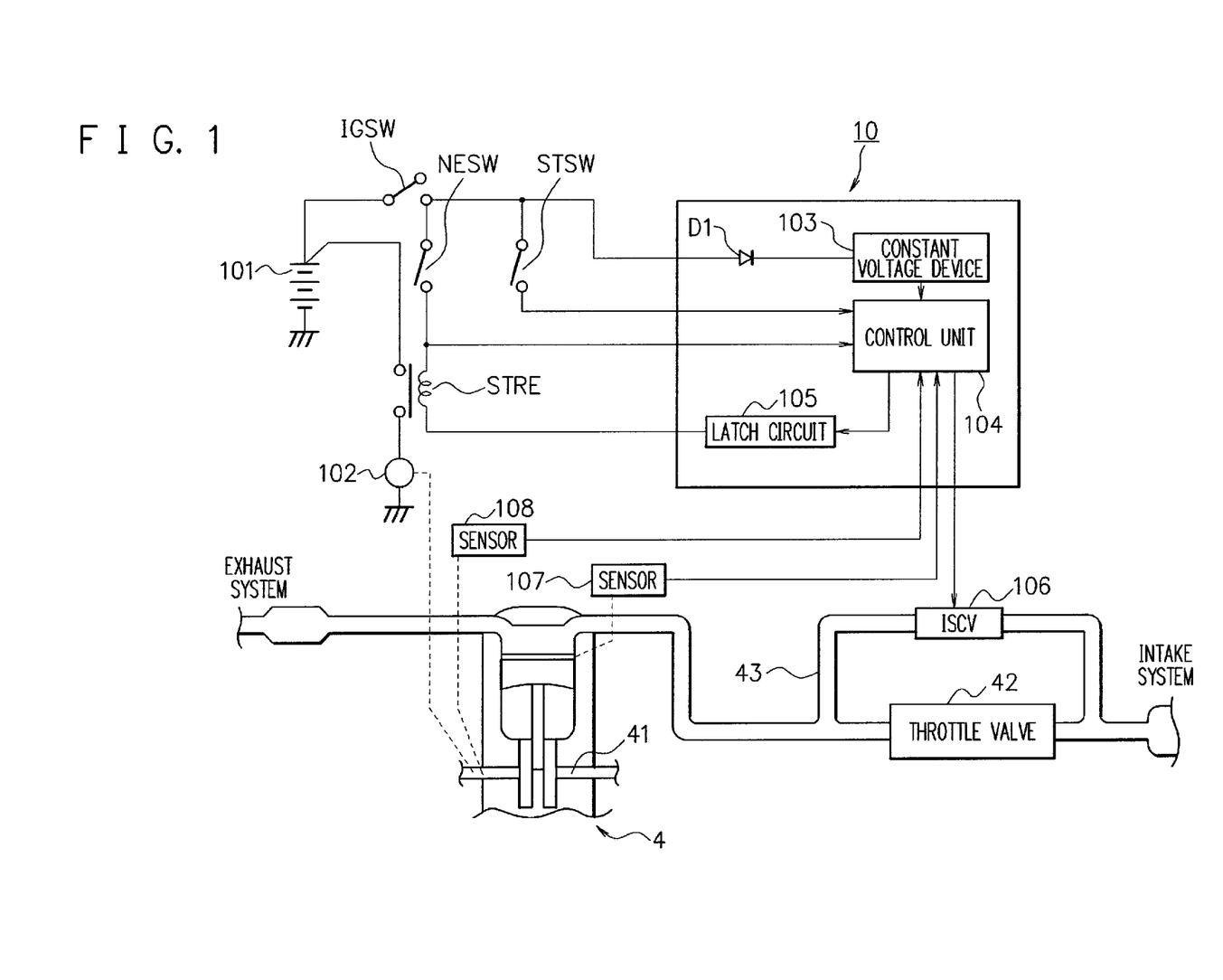
FIG. 1 is a functional block diagram showing a structure of an engine start control device according to this embodiment.

First, with reference to FIG. 1, a structure of an engine start control device according to this embodiment will be described. FIG. 1 is a functional block diagram of the engine start control device according to this embodiment.

As shown in FIG. 1, the engine start control device 10 according to this embodiment includes: a battery 101 which supplies power to each part of the engine start control device 10; a starter motor 102 which rotates a crankshaft 41 of an engine 4 by the power from the battery 101; a constant voltage device 103 which generates a reference voltage based on the power supplied from the battery 101; a control unit 104 which operates by the reference voltage from the constant voltage device 103 and includes a CPU and a memory; a latch circuit 105 which holds a command for current control from the control unit 104 to the starter motor 102; an ISCV (control valve) 106 which operates according to a command for idle speed control from the control unit 104; and sensors 107, 108 which detect states of respective parts of the engine 4 to notify the states to the control unit 104.

The engine start control device 10 further includes: an ignition switch IGSW which controls the power supply from the battery 101 to the constant voltage device 103, the control unit 104, and so on; a diode D1 which allows the passage of only a current in a direction from the battery 101 to the constant voltage device 103; a start switch STSW which controls an input of a voltage from the battery 101 to the control unit 104; a starter relay STRE which controls current supply to the starter motor 102 based on the command for current control held by the latch circuit 105; and a neutral switch NESW which controls a voltage of one end side of the starter relay STRE so that the starter relay STRE can be turned on only in a neutral state.

One terminal of the starter motor 102 is connected to the battery 101 via the starter relay STRE. Another terminal of the starter motor 102 is grounded. A shaft of the starter motor 102 is structured so as to be capable of coupling with the crankshaft 41 via a gear, a clutch mechanism, and so on. With this structure, when the starter relay STRE turns on, a current passes through the starter motor 102 to rotate the starter motor 102, so that the crankshaft 41 is driven.

The constant voltage device 103 is connected to the battery 101 via the ignition switch IGSW. The constant voltage device 103 is structured to be capable of generating the reference voltage based on the power supplied from the battery 101 when the ignition switch IGSW turns on. The reference voltage generated by the constant voltage device 103 is supplied to the control unit 104 and so on.

The control unit 104 operates by the reference voltage supplied from the constant voltage device 103. The control unit 104 is connected to an input end of the latch circuit 105 and outputs, to the latch circuit 105, bit data with a predetermined bit number as the command for current control which controls the current supply to the starter motor 102. Further, the control unit 104 is connected to an output end of the latch circuit 105 via a control coil of the starter relay STRE so as to be capable of detecting a state of the latch circuit 105.

Further, the control unit 104 is connected to the ISCV 106 and outputs, to the ISCV 106, bit data with a predetermined bit number as the command for idle speed control. Further, the control unit 104 is structured to be capable of determining a state of the engine 4 by detecting states of the sensors 107, 108. To the control unit 104, the voltage from the battery 101 is directly input via the ignition switch IGSW and the start switch STSW. With this structure, when the start switch STSW is turned on while the ignition switch IGSW is on, the voltage from the battery 101 is applied as a start signal.

The latch circuit 105 is a voltage holding circuit structured to be able to keep holding the command for current control (bit data) input as a voltage value from the control unit 104. The latch circuit 105 is structured to keep holding the command for current control which is input last time until a new command for current control is input from the control unit 104. Therefore, when a command instructing the current supply to the starter motor 102 (hereinafter, current supply command) is input from the control unit 104, the latch circuit 105 keeps holding the current supply command until a command for stopping the current supply to the starter motor 102 (hereinafter, stop command) is thereafter input. Further, when the stop command for the starter motor 102 is input from the control unit 104, the latch circuit 105 keeps holding the stop command until the current supply command for the starter motor 102 is thereafter input.

The latch circuit 105 is structured to be capable of outputting the command for current control that it holds to the control coil of the starter relay STRE. That is, the voltage value held in the latch circuit 105 is applied to one end of the control coil of the starter relay STRE. Since the voltage applied to the one end of the control coil is different depending on whether the command is the current supply command or the stop command, a potential difference at both ends of the control coil differs depending on whether the command is the power supply command or the stop command. Owing to this, a current passing through the control coil is controlled and on/off of the starter relay STRE is controlled. Note that the kind of the latch circuit 105 is not particularly limited. A voltage holding circuit having any structure may be applied, provided that it is capable of holding the command for current control and outputting it to the starter relay STRE.

The ISCV 106 is attached to a bypass channel (gas channel) 43 provided so as to bypass a throttle valve 42 of the engine 4, so as to be capable of controlling an intake amount of the engine 4 according to an operation state of the engine 4. The ISCV 106 includes a stepping motor which operates according to the command for idle speed control input from the control unit 104, and is structured to be capable of adjusting its opening degree by a step amount according to the command for idle speed control. This makes it possible for the engine 4 to secure an intake amount corresponding to the command for idle speed control. Since the opening degree of the ISCV 106 is regulated in terms of the step amount from an initial position (initial opening degree) by the control unit 104, the control unit 104 initializes the opening degree as required in order to measure the initial position of the ISCV 106.

The sensors 107, 108 are structured to be capable of detecting the states of the respective parts of the engine 4 to notify the states to the control unit 104. The sensor 107 is, for example, a temperature sensor for measuring a temperature of the engine, and the sensor 108 is, for example, a crank angle sensor for controlling a crank angle. Note that the sensors that the engine start control device 10 has are not limited to these.

Figure 2:
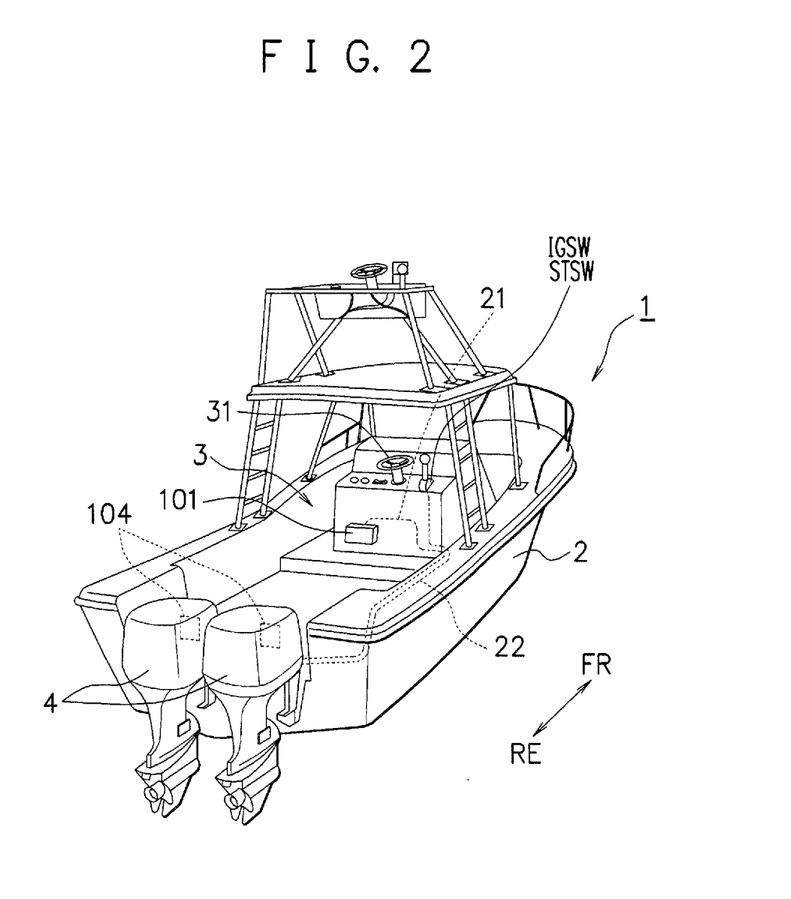
FIG. 2 is a perspective view showing an outer appearance of a ship to which the engine start control device according to this embodiment is applied.

FIG. 2 is a perspective view showing an outer appearance of a ship to which the engine start control device 10 according to this embodiment is applied. Note that, though FIG. 2 shows an example where the engine start control device 10 is applied to the ship, an application target is not limited to this and can be changed. For example, the engine start control device 10 according to the present invention may be applied to engines of a motorcycle, a four-wheel vehicle, and the like.

As shown in FIG. 2, a ship 1 includes: a hull 2 made of steel, fiber reinforced plastic (FRP), or the like; a steering part 3 provided at a position slightly deviated from a center of the hull 2 toward a bow; and two engines 4 attached to a stern of the hull 2. On the steering part 3, the battery 101, the ignition switch IGSW, the start switch STSW, and so on which are included in the engine start control device 10 are provided in addition to a steering wheel 31. The battery 101, the ignition switch IGSW, and the start switch STSW are connected to the engines 4 via cables 21, 22 provided on the hull 2. The control units 104 and so on included in the engine start control device 10 are attached to the engines 4.

Figure 3:
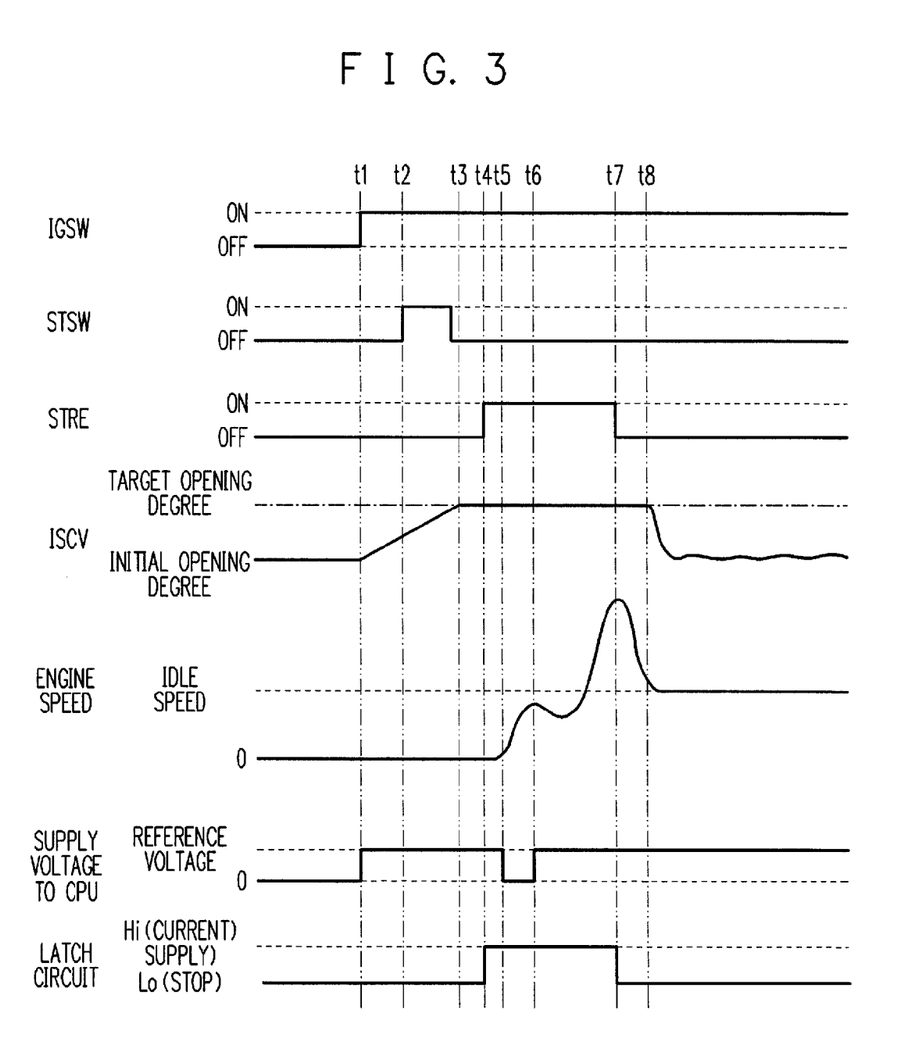
FIG. 3 is an operation timing chart of the engine start control device according to this embodiment.
Figure 4:
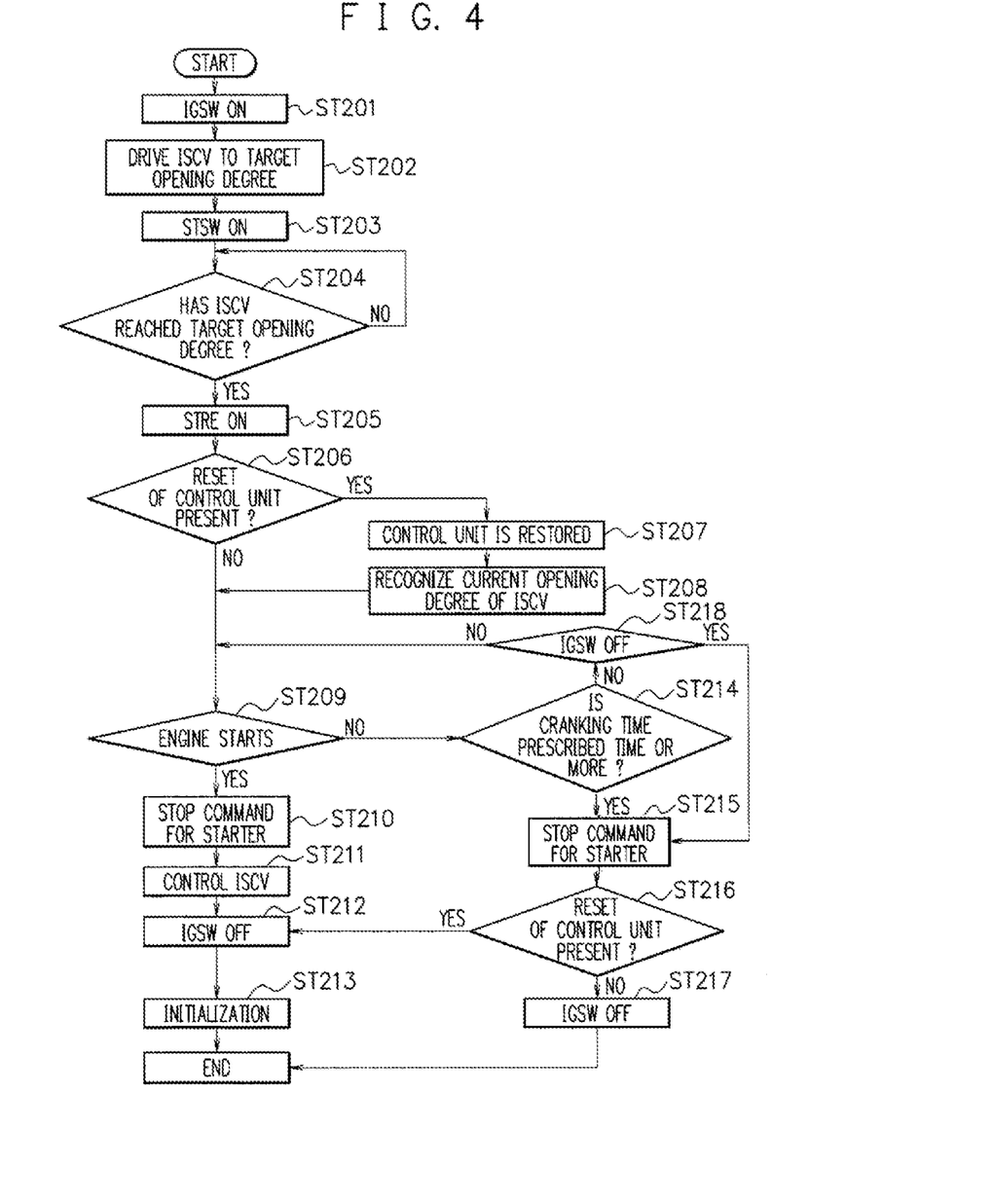
FIG. 4 is a flowchart showing a flow from start to stop of an engine to which the engine start control device according to this embodiment is applied.

Next, an operation of the engine start control device 10 according to this embodiment will be described in detail with reference to FIG. 3 and FIG. 4. FIG. 3 is an operation timing chart of the engine start control device 10 according to this embodiment. FIG. 4 is a flowchart showing a flow from start to stop of the engine 4 to which the engine start control device 10 according to this embodiment is applied.

First, with reference to FIG. 3, the operation timings of the engine start control device 10 will be described. When the ignition switch IGSW is turned on at a given timing t1, the constant voltage device 103 generates the reference voltage based on the supply voltage from the battery 101. When the reference voltage is supplied from the constant voltage device 103 to the control unit 104, the control unit 104 is activated. The control unit 104 sets the opening degree of the ISCV 106 suitable for starting the engine 4 as the target opening degree based on the engine temperature notified from the sensor 107, or the like. When the target opening degree is set, the control unit 104 outputs the command for idle speed control to the ISCV 106 in order for the opening degree of the ISCV 106 to reach the target opening degree.

The command for idle speed control corresponds to the step amount from the initial position (initial opening degree) of the ISCV 106 decided at the last initialization up to the target opening degree. Therefore, the stepping motor of the ISCV 106 changes the opening degree of the ISCV 106 from the initial position according to the step amount corresponding to the command for idle speed control.

When the start switch STSW is turned on at a later timing t2, the voltage from the battery 101 is input to the control unit 104 as the start signal. When the start signal is input, the control unit 104 determines whether or not the opening degree of the ISCV 106 has reached the target opening degree. Since the opening degree of the ISCV 106 has not reached the target opening degree at the timing t2 in FIG. 3, the control unit 104 does not output the current supply command to the latch circuit 105. Therefore, in this state, "Lo" corresponding to the stop command is held in the latch circuit 105. Further, "Lo" is applied to the one end of the control coil of the starter relay STRE, so that the starter relay STRE is kept off.

When the opening degree of the ISCV 106 reaches the target opening degree at a timing t3, the control unit 104 confirming this outputs the current supply command to the latch circuit 105 at a timing t4. As a result, "Hi" corresponding to the power supply command is held in the latch circuit 105. Further, "Hi" held in the latch circuit 105 is applied to the one end of the control coil of the starter relay STRE. Consequently, a current for turning on the starter relay STRE passes through the control coil of the starter relay STRE, so that the starter relay STRE turns on.

When the starter relay STRE turns on at the timing t4, the current passes through the starter motor 102, so that the starter motor 102 is driven. At this time, a large current passes through the starter motor 102, so that the supply voltage of the battery 101 temporarily lowers in some case. When the supply voltage of the battery 101 lowers at a timing t5 in FIG. 3, the constant voltage device 103 is not capable of supplying the reference voltage to the control unit 104, so that the control unit 104 stops. At a timing t6 after the current supply to the starter motor 102 is stabilized, the supply voltage of the battery 101 recovers, so that the control unit 104 is reactivated (is restored).

Regardless of the resetting of the control unit 104 at the timings t5 to t6, the latch circuit 105 keeps holding "Hi" corresponding to the current supply command. Therefore, the current supply to the starter motor 102 is continued at and after the timing t4. That is, the current supply to the starter motor 102 is continued also at the timings t5 to t6, and a rotational force is continuously given to the crankshaft 41 owing to the driving of the starter motor 102.

Based on the command for current control output from the latch circuit 105, the restored control unit 104 determines whether or not the current activation is the reactivation due to the resetting. That is, the control unit 104 determines whether the power is supplied to the control unit 104 because the ignition switch IGSW is turned on or the power is supplied to the control unit 104 because it is reset due to the decrease of the supply voltage of the battery 101. Concretely, when the command for current control output from the latch circuit 105 is "Hi", the control unit 104 determines that the current activation is the reactivation due to the resetting. On the other hand, when the command for current control output from the latch circuit 105 is "Lo", the control unit 104 determines that the current activation is not the reactivation due to the resetting but is the activation due to the turning-on of the ignition switch IGSW.

When determining that the current activation is the reactivation due to the resetting, the control unit 104 fixes the opening degree of the ISCV 106 at an opening degree at the current moment (timing t6). At the timing t4 when the starter relay STRE turns on, since the opening degree of the ISCV 106 has reached the target opening degree, the control unit 104 fixes the opening degree at the target opening degree. Further, the control unit 104 does not initialize the opening degree of the ISCV 106. That is, the control unit 104 does not output the command for idle speed control to the ISCV 106.

Further, in this case, the control unit 104 determines the state of the engine 4 from the engine temperature notified from the sensor 107, or the like and recognizes the opening degree of the ISCV 106 at the current moment (timing t6). Here, at the timing t4 when the starter relay STRE turns on, the opening degree of the ISCV 106 has reached the target opening degree. Further, the opening degree of the ISCV 106 is fixed at the target opening degree. Therefore, the control unit 104 calculates the target opening degree from the engine temperature notified from the sensor 107, and is capable of recognizing the opening degree of the ISCV 106 at the current moment (timing t6).

Incidentally, when determining that the current activation is not the reactivation due to the resetting but is the activation due to the turning-on of the ignition switch IGSW, the control unit 104 performs the same operation as that at the normal start time (in the case where the current activation is not the reactivation). That is, the control unit 104 sets the opening degree of the ISCV 106 suitable for starting the engine 4 based on the engine temperature notified from the sensor 107, or the like and outputs the command for idle speed control to the ISCV 106.

When the engine speed (rotation speed of the crankshaft) thereafter reaches a predetermined value or more and the engine 4 starts, the control unit 104 outputs the stop command to the latch circuit 105 at a timing t7. When the stop command is input, the latch circuit 105 holds "Lo" corresponding to the stop command. As a result, "Lo" held in the latch circuit 105 is applied to the one end of the control coil of the starter relay STRE, so that the starter relay STRE is turned off.

At a timing t8 after the engine 4 starts, the control unit 104 releases the fixation of the opening degree of the ISCV 106. Then, in order to control the opening degree of the ISCV 106 so that the idle speed becomes constant, the control unit 104 outputs the command for idle speed control to the ISCV 106. This control is continued until the engine 4 is stopped.

Next, with reference to FIG. 4, the flow from start to stop of the engine 4 to which the engine start control device 10 according to this embodiment is applied will be described. First, when an operator turns on the ignition switch IGSW (Step ST201), the constant voltage device 103 supplies the reference voltage to the control unit 104, so that the control unit 104 is activated. The control unit 104 sets the target opening degree of the ISCV 106 suitable for starting the engine 4, based on the engine temperature notified from the sensor 107, or the like and outputs the command for idle speed control to the ISCV 106 (Step ST202). Consequently, the driving of the ISCV 106 to the target opening degree is started.

When the operator turns on the start switch STSW in this state (Step ST203), the control unit 104 determines whether or not the opening degree of the ISCV 106 has reached the target opening degree (Step ST204). When the opening degree of the ISCV 106 has reached the target opening degree (Step ST204: YES), the control unit 104 outputs the current supply command to the latch circuit 105, so that the starter relay STRE is turned on (Step ST205). When the opening degree of the ISCV 106 has not reached the target opening degree (Step ST204: NO), the control unit 104 does not output the current supply command to the latch circuit 105 and the starter relay STRE is kept off. In this case, after a predetermined time passes, the control unit 104 determines again whether or not the opening degree of the ISCV 106 has reached the target opening degree (Step ST204).

When the starter relay STRE turns on and a current passes through the starter motor 102, the driving of the crank by the starter motor 102 (cranking) is started. When the control unit 104 is reset during the cranking (Step ST206: YES), the control unit 104 is restored after the supply voltage of the battery 101 is recovered (Step ST207). Based on the command for current control output from the latch circuit 105, the restored control unit 104 recognizes that the current activation is the reactivation due to the resetting and fixes the opening degree of the ISCV 106. Then, the control unit 104 recognizes the current opening degree of the ISCV 106 from the engine temperature, or the like (Step ST208). At this time, the cranking is continued owing to the current supply command held in the latch circuit 105. Incidentally, when the control unit 104 is not reset during the cranking (Step ST206: NO), the cranking is continued without any other special control being performed.

When the engine 4 is started by the cranking (Step ST209: YES), the control unit 104 outputs the stop command to the latch circuit 105, so the starter relay STRE is turned off (Step ST210). Consequently, the starter motor 102 stops. Further, the control unit 104 releases the fixation of the opening degree of the ISCV 106 and controls the opening degree of the ISCV 106 so that the idle speed becomes constant (Step ST211). Consequently, a stable operation of the engine 4 is realized. Thereafter, when the operator turns off the ignition switch IGSW in order to stop the engine 4 (Step ST212), the engine 4 stops after the ISCV 106 is initialized (Step ST213).

When the engine 4 is not started by the cranking (Step ST209: NO), the control unit 104 determines whether or not the cranking time has exceeded a prescribed time (Step ST214). When the cranking time has exceeded the prescribed time (Step ST214: YES), the control unit 104 outputs the stop command to the latch circuit 105 in order to prevent a breakage of the starter motor 102, so that the starter relay STRE is turned off (Step ST215).

Here, when the resetting of the control unit 104 has occurred (Step ST216: YES) and the operator turns off the ignition switch IGSW (Step ST212), the engine 4 is stopped after the initialization (Step ST213) of the ISCV 106. When the resetting of the control unit 104 has not occurred (Step ST216: NO) and the operator turns off the ignition switch IGSW (Step ST217), the engine 4 stops without the initialization of the ISCV 106.

When the cranking time has not exceeded the prescribed time (Step ST214: NO) and the operator turns off the ignition switch IGSW (Step ST218: YES), the control unit 104 outputs the stop command to the latch circuit 105, so that the starter relay STRE is turned off (Step ST215). When the operator does not turn off the ignition switch IGSW (Step ST218: NO), the flow at and after Step ST209 is executed.

Figure 5:
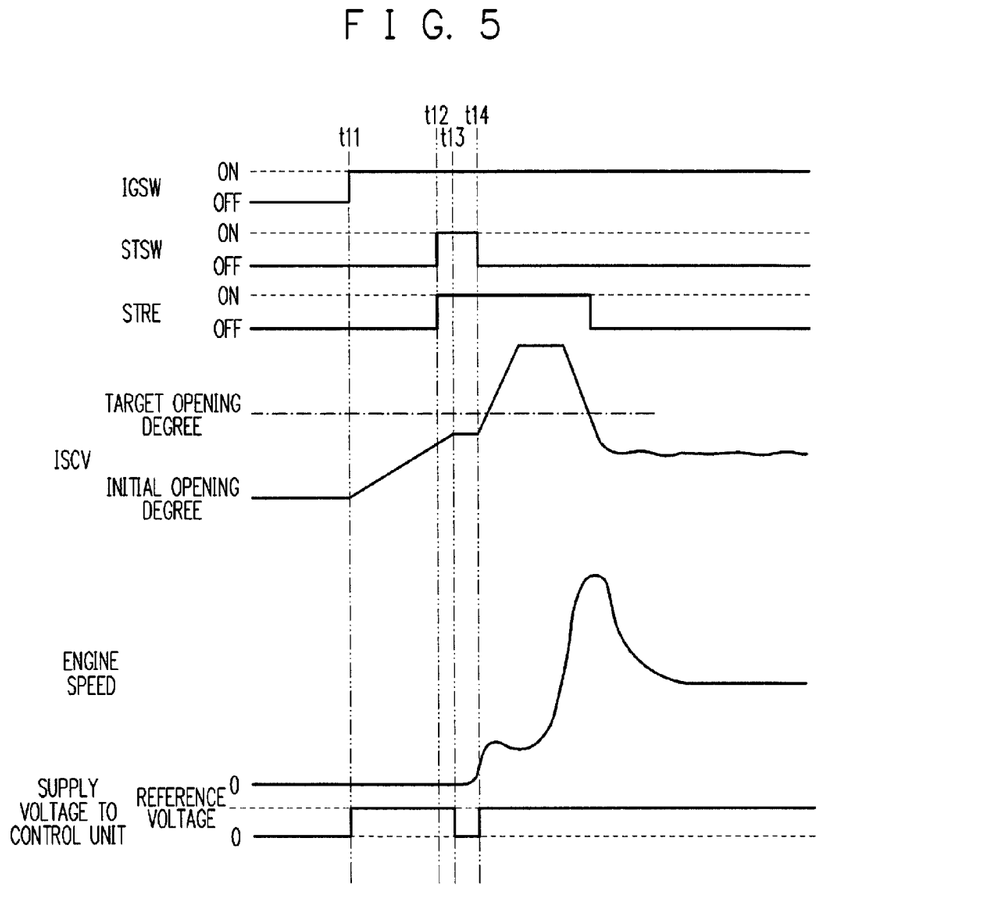
FIG. 5 is an operation timing chart of a comparative example of engine start control device.

FIG. 5 is an operation timing chart of an engine start control device which does not has a latch circuit and whose control unit does not perform the control of turning on a starter relay after an opening degree of an ISCV reaches a target opening degree. Hereinafter, a description is given by comparing the engine start control device 10 according to this embodiment and the engine start control device according to a comparative example shown in FIG. 5.

In the engine start control device according to the comparative example, when an ignition switch is turned on at a given timing t11, the control unit is activated to start the driving of the ISCV. When a start switch is turned on at a later timing t12, a start signal is input to the control unit. The engine start control device according to the comparative example does not perform the control of turning on the starter relay after the opening degree of the ISCV reaches the target opening degree, unlike the engine start control device 10 according to this embodiment. Therefore, when the start signal is input to the control unit, the control unit immediately outputs a current supply command to the starter relay. Consequently, the starter relay turns on at a timing t12, so that a current passes through a starter motor.

When a large current passes through the starter motor at a timing t13 and a supply voltage of a battery lowers, a reference voltage is not supplied, so that the control unit stops. Then, the output of a command for idle speed control from the control unit stops, so that the ISCV stops in a state where the target opening degree is not reached. Thereafter, at a timing t14 when the current supply to the starter motor is stabilized, the supply voltage of the battery is recovered, so that the control unit is restored.

Unlike the engine start control device 10 according to this embodiment, in the engine start control device according to the comparative example, the control unit is not capable of determining the presence/absence of the resetting. Therefore, the control unit tries to drive the ISCV to the target opening degree again after its restoration. Here, since the target opening degree is specified in terms of the step amount from the initial position (initial opening degree), the control unit drives the ISCV according to the specified step amount, with the position of the ISCV at the time of the restoration being as the initial position. Such control results in a great deviation of the opening degree of the ISCV from the target opening degree that it should have. As a result, the engine speed greatly increases or the engine speed remarkably decreases. Further, since the control unit is not capable of recognizing the accurate position of the ISCV after the restoration, the idle speed is liable to become unstable after the engine starts.

Further, in the case of the engine start control device structured to initialize the ISCV at the time of the activation of the control unit, the control unit tries to execute the initialization of the ISCV even after the restoration. Since the initialization of the ISCV is customarily performed by setting the opening degree of the ISCV to full opening or to full closing, the engine speed greatly increases or the engine speed remarkably decreases also in this case.

As described above, unlike the engine start control device 10 according to this embodiment, the engine start control device according to the comparative example does not have the latch circuit 105 and its control unit does not perform the control of turning on the starter relay after the opening degree of the ISCV reaches the target opening degree. Therefore, in the engine start control device according to the comparative example, there occur problems such as poor start and an unstable behavior of the engine.

On the other hand, the engine start control device 10 according to this embodiment performs the control so that the current supply to the starter motor 102 is started after the opening degree of the ISCV 106 reaches the target opening degree for the start time of the engine 4, and the latch circuit 105 continues the power supply to the starter motor 102 according to the command for current control that the latch circuit 105 keeps holding even when the control unit 104 is reset. Therefore, even when the supply voltage from the battery 101 lowers and the control unit 104 is reset, it is possible to continue starting the engine 4 while appropriately maintaining the opening degree of the ISCV 106. This can prevent the poor start and the unstable behavior of the engine 4.

Further, since the opening degree of the ISCV 106 is fixed after the opening degree of the ISCV 106 reaches the target opening degree for the start time of the engine 4, it is possible to start the engine 4 while appropriately maintaining the opening degree of the ISCV 106. Further, even when the supply voltage lowers and the control unit 104 is reset, the opening degree of the ISCV 106 is not initialized, which can prevent a sharp increase and stall of the rotation speed at the start time. Further, since the control unit 104 recognizes the opening degree of the ISCV 106 from the state of the sensor 107 being the engine temperature sensor, or the like at the time of the reactivation due to the resetting, it is possible to prevent the disagreement between the actual opening degree of the ISCV 106 and the opening degree of the ISCV 106 recognized by the control unit 104. This makes it possible to properly maintain the rotation speed of the engine 4 such as the idle speed even when the control unit 104 is reset. Further, since the opening degree of the ISCV 106 is initialized only when the initialization is required, the number of times of the initialization can be reduced. Further, since there is no need for the initialization at the start time of the engine 4, it is possible to reduce the time required for the restart.

Note that the present invention is not limited to the above-described embodiment and can be carried out with various changes being made. For example, in the above-described embodiment, the control unit 104 outputs the bit data each with the predetermined bit number (digital data) as the command for current control and the command for idle speed control, but analog data may be used.

According to the present invention, it is possible to provide an engine start control device capable of preventing the poor start and the unstable behavior of an engine.

Further, in the above-described embodiment, the sizes, shapes, and so on shown in the attached drawings are not restrictive and can be appropriately changed within the scope where the effects of the present invention are exhibited. Besides, the embodiment can be carried out by being appropriately changed unless it does not depart from the scope of the object of the present invention.

The engine start control device according to the present invention is useful as, for example, an engine start control device of a ship.

What is claimed is:
1. An engine start control device comprising:
a control valve which adjusts a gas flow rate of a gas channel provided so as to bypass a throttle valve of an engine;
a starter motor capable of driving a crankshaft of the engine;
a control unit which controls an opening degree of the control valve and a current supply to the starter motor; and a latch circuit which holds a current supply command and a stop command as a command for current control from the control unit to the starter motor, wherein:

even when the control unit is reset during cranking, the latch circuit continues the current supply to the starter motor according to the command for current control that the latch circuit keeps holding;

the control unit outputs the current supply command to the latch circuit so as to cause the current supply to the starter motor to begin after the opening degree of the control valve reaches a target opening degree suitable for an engine start time;

the control unit outputs the stop command to the latch circuit so as to cause the current supply to the starter motor to stop when one of the following occurs: the engine is started, the engine is not started and a cranking time exceeds a predetermined time, or the engine is not started and an operation to stop the engine is performed before the cranking time does not exceed the predetermined time;

the control unit further determines whether or not the control unit is reset during cranking, based on the current supply command or the stop command held by the latch circuit, and fixes the opening degree of the control valve without initializing the opening degree of the control valve in a case where the control unit is reset;

the control unit initializes the opening degree of the control valve when the power supply to the control unit is stopped under one of the following conditions:
i) after the engine is started; and
ii) after all of the following occur; the engine is not started, and the control unit is reset during cranking; and the control unit does not initialize the opening degree of the control valve when the power supply to the control unit is stopped after all of the following occur: the engine is not started, and the control unit is not reset during cranking.

* * * * *